United States Patent [19]

Watanabe et al.

[11] 4,000,516
[45] Dec. 28, 1976

[54] APPARATUS FOR MAINTAINING CONSTANT THE PACKING DENSITY OF MAGNETIC TAPE WITHIN A MAGAZINE

[75] Inventors: Kazuo Watanabe; Tetsuya Fuchikuchi, both of Tokyo, Japan

[73] Assignee: TDK Electronics Company, Limited, Tokyo, Japan

[22] Filed: Jan. 30, 1975

[21] Appl. No.: 545,558

[30] Foreign Application Priority Data

Jan. 30, 1974 Japan .............................. 49-13105
Jan. 30, 1974 Japan .............................. 49-13104

[52] U.S. Cl. .................. 360/71; 242/184; 360/132
[51] Int. Cl.$^2$ .................. G11B 15/20; G11B 23/06
[58] Field of Search ............... 360/71, 132, 93, 94, 360/95, 96; 226/26, 118; 242/75.44, 75.52, 182, 184, 186

[56] References Cited

UNITED STATES PATENTS

| | | | |
|---|---|---|---|
| 2,499,700 | 3/1950 | Tinkham | 360/71 |
| 2,542,506 | 2/1951 | Gibson | 360/71 |
| 3,024,320 | 3/1962 | Nye | 360/71 |
| 3,310,250 | 3/1967 | Michiels | 242/184 |
| 3,360,613 | 12/1967 | Cooper | 360/71 |
| 3,791,607 | 2/1974 | Klang | 242/184 |

FOREIGN PATENTS OR APPLICATIONS 268,520  8/1964  Australia ............ 242/182

*Primary Examiner*—Jay P. Lucas
*Attorney, Agent, or Firm*—Oblon, Fisher, Spivak, McClelland & Maier

[57] ABSTRACT

Magnetic tape apparatus includes a master tape loop box magazine for temporarily storing a magnetic tape in a zig-zag condition, a transferring device disposed within the magazine for moving the tape to a tape outlet of the magazine, a detector for detecting the apparent density of the magnetic tape at the magazine outlet, and a travelling device which is operated only when the apparent density of the magnetic tape detected by the detector is below or less than a predetermined value. The apparatus is applicable to both endless and reel-to-reel type tape apparatus.

8 Claims, 9 Drawing Figures

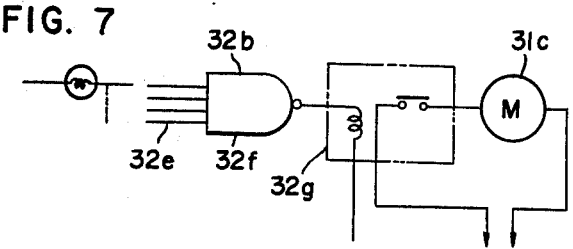
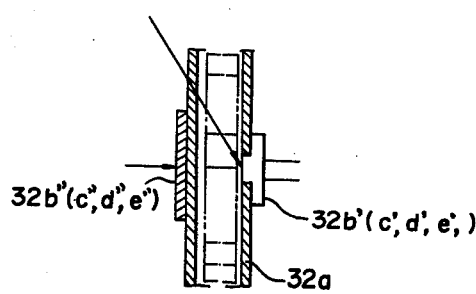
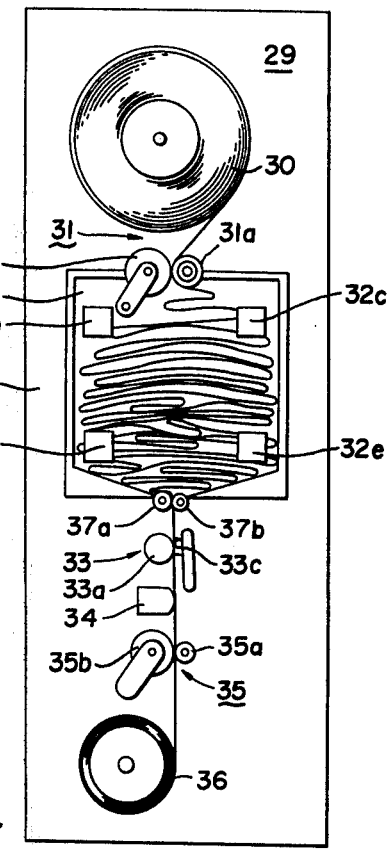
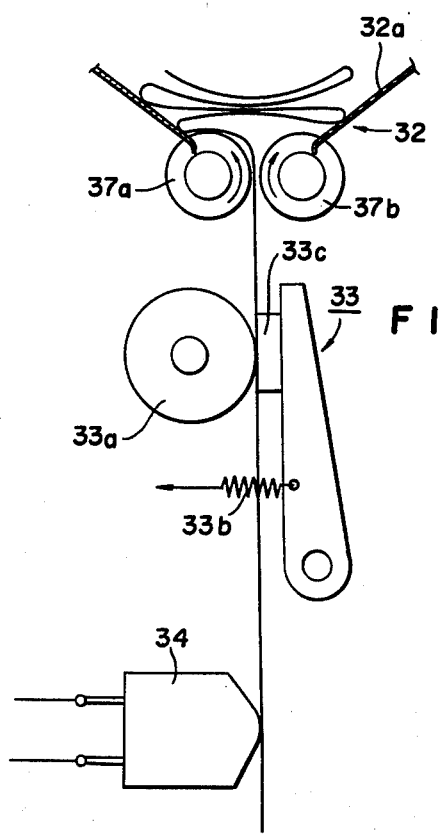

APPARATUS FOR MAINTAINING CONSTANT THE PACKING DENSITY OF MAGNETIC TAPE WITHIN A MAGAZINE

BACKGROUND OF THE INVENTION

1. Field of the Invention

The present invention relates generally to magnetic tape apparatus and more particularly to magnetic tape apparatus wherein the magnetic tape can smoothly travel in a stable condition without jet air and at high speed.

1. Description of the Prior Art

It is generally known that a magnetic tape may be conventionally temporarily maintained in a zig-zag condition within a magazine, disposed upon a vertical or substantially vertical plate so as to serve as a master loop box within high speed recording apparatus. Within such conventional magnetic tape apparatus, the magnetic tape is gradually compressed within the lower portion of the magazine by means of the dead-weight thereof which apparently causes high apparent density of the tape.

Accordingly, when the magnetic tape is to be removed from the outlet of the magazine, severe movement and resistance between the layers of the magnetic tape results in limiting the travelling speed of the magnetic tape. More particularly, the magnetic tape fed into the magazine by feeding means is stored by the dead-weight of the magnetic tape in a zig-zag condition and then is taken out of the magazine whereby the movement of the magnetic tape is not smooth and the resistance for uniformly winding the magnetic tape upon the take-up reel cannot be maintained constant due to the fluctuation in the density of the magnetic tape at the magazine outlet. In summary, the stable travelling operation of the magnetic tape has been seriously inferior because of the above-mentioned disadvantages.

Moreover, within the magnetic tape apparatus equipped with a deadweight movement type magazine, the magnetic tape adheres to the magazine because of an electrostatic charge generated when the magnetic tape travels at high speed, such as for example, greater than 6 m/sec. Accordingly further difficulty in moving the magnetic tape smoothly within the magazine is experienced.

In order to overcome such aforenoted disadvantages, it has been proposed, and practically used, to provide a belt or a roller within the bottom portion of the magazine so as to facilitate movement of the magnetic tape disposed within the zig-zag condition. Within such conventional apparatus, the movement of the magnetic tape while in the zig-zag condition is carried out at constant speed during the entire travel period of the tape whereby the apparent density of the magnetic tape within the magazine is affected. However it is quite difficult to attain a uniform apparent density of the magnetic tape at the magazine outlet and a uniform resistance for taking-up the tape.

Similarly, or alternatively, a recorded magazine tape may be prepared by means of a high speed recording apparatus wherein a pancake type magnetic tape is fed and taken-up under recording or reproducing conditions and is then packed within a magazine. As shown within FIG. 5 which illustrates one example of such type of conventional apparatus, the magnetic tape is fed from a pancake type 21 so as to pass a buffer arm 22, a guide roller 23, a guide roller 25, and a pinchroller 26 and a capstan 27 and be taken up upon a take-up reel 28. The inertia force of the pancake type tape 21 however is so high as to substantially extend the threshold time and impart on undesirable degree of tension to the magnetic tape upon commencement of the operation as to damage the magnetic layer of the tape.

In addition, when the diameter of the tape pancake decreases as the tape continues to travel, the feeding resistance gradually increases so as to in turn increase the tension of the tape whereby fluctuation in the travelling speed of the magnetic tape is disadvantageously caused. In summary, it has been difficult to attain the desired demand of a threshold period of less than 0.1 sec. or a travelling speed of the magnetic tape greater than 3 m/sec.

SUMMARY OF THE INVENTION

Accordingly, it is an object of the present invention to provide a magnetic tape apparatus which can facilitate the smooth travel of the magnetic tape at a constant travelling speed and under a constant resistance value for taking up the tape.

Another object of the present invention is to provide a magnetic tape apparatus which feeds the magnetic tape at a high travelling speed without jet air and under stable conditions.

The magnetic tape apparatus can be used for a master reproducer in a duplicating system.

The foregoing objectives are achieved according to this invention through the provision of a magnetic tape apparatus which includes a master loop box magazine for temporarily storing a magnetic tape in a zig-zag condition, a transferring device disposed within the magazine so as to move the magnetic tape while in the zig-zag condition to a tape outlet, a detector for detecting the apparent desity of the magnetic tape around the tape outlet, and a travelling device which is operative only when the apparent density of the magnetic tape detected by the detector is less than a predetermined value.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 6 is a schematic view of another embodiment of a magnetic tape apparatus which is similar to the apparatus of FIG. 5 however is constructed in accordance with the present invention;

FIG. 7 is another block diagram of a control circuit of the apparatus;

FIG. 8 is an enlarged sectional side view of a detector adapted to be disposed within the master loop box; and FIG. 9 is an enlarged view of the magazine tape outlet, a tensioning device, and a magnetic head within the embodiment of FIG. 6.

DETAILED DESCRIPTION OF THE PREFERRED EMBODIMENTS

Figure 1:
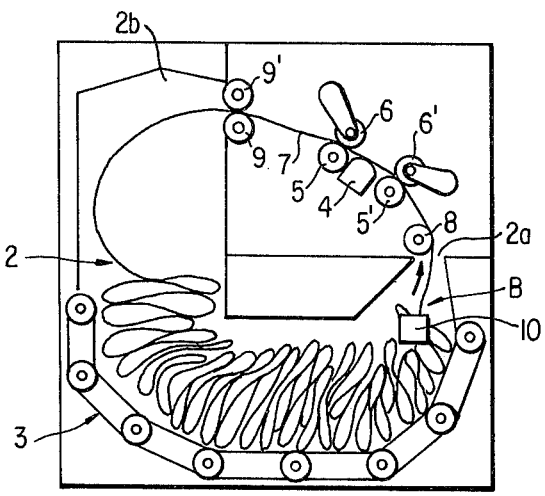
FIG. 1 is a schematic view of one embodiment of a magnetic tape apparatus constructed in accordance with the present invention and showing its cooperative parts.
Figure 2:
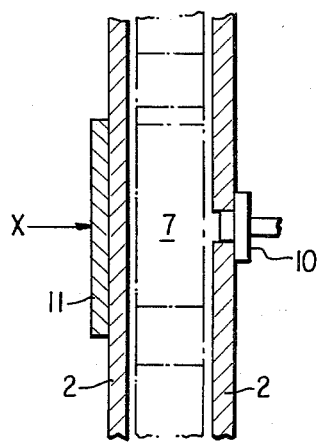
FIGS. 2 and 3 are enlarged sectional side views of a detector disposed within the master loop box of the tape apparatus.
Figure 3:
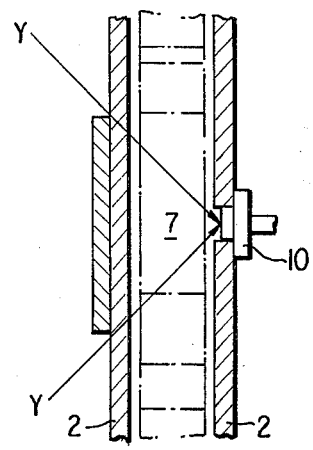
Figure 4:
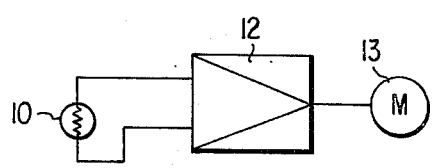
FIG. 4 is a block diagram of a control circuit of the apparatus.
Figure 5:
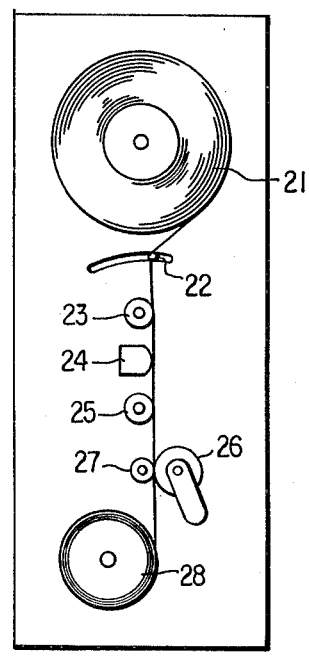
FIG. 5 is a schematic view of a conventional magnetic tape apparatus.

Referring now to the drawings and more particularly to FIG. 1 thereof, there is shown one embodiment of a magnetic tape apparatus which has a master loop box for a master reproducer within a duplicating system and which includes a vertical or substantially vertical plane plate 1 which is equipped with a magazine 2 which is made of transparent material, such as for example, glass plate or an acryl type polymer plate, the bottom of the magazine 2 being provided with a transferring device 3, such as for example, a plurality of belt conveyers. A magnetic head 4 is disposed exteriorly of magazine 2 and is interposed between a pair of capstans 5 and and 5' while a pair of pinch-rollers 6 and 6' are disposed in contact with capstans 5 and 5' respectively. An endless magnetic tape 7 is withdrawn from the magazine 2 through an outlet 2a thereof and is passed between the capstan 5' and roller 6' and past the magnetic head 4 so as to be returned through an inlet 2b of the magazine 2 after passing between capstan 5 and roller 6.

A guide roller 8 is disposed outside of magazine 2 and immediately adjacent the outlet 2a while a pair of guide rollers 9 and 9' are similarly disposed with respect to inlet 2b. As a result of recycling of the tape 7, the magnetic tape 7 returned through the inlet 2b to the magazine 2 becomes stacked upon the transferring device 3 in a zig-zag condition.

A light projector, not shown, is disposed upon one side of the tape path associated with the outlet 2a of the magazine 2 while a detector 10, such as for example, a Cds detector for receiving the light from the projector, is disposed upon the other side of the path. A light baffle plate or light shield 11 is interposed between the projector and the magnetic tape 7 formed in the zig-zag condition near the outlet 2a whereby the light projected from the projector and directed perpendicular to the detector 10 or parallel to the lateral axis of the tape 7 is prevented from reaching the detector 10, only those rays of light inclined to the surface of the detector 10 or the lateral axis of tape 7 being received by the detector 10.

The detector 10 is connected through means of a suitable amplifier 12 to a motor 13 which is provided for driving the transferring device 3 whereby when the quantity of light received by the detector 10 is greater than a predetermined value, the motor 13 is actuated so as to drive the device 3 and transfer the magnetic tape 7 to the outlet 2a within the magazine 2 while when the quantity of light received by the detector 10 is less than the predetermined value, the motor 13 is de-activated. Within the embodiment, a single light source is used as the projector however it is possible to project transversely directed spot light beams having a narrow width or the like to the detector 10 along an inclined or oblique plane. It is also possible to assemble the light shield 11 within the projector, and it is further possible to use natural light as the projector.

Within the magnetic tape apparatus which has a master loop box for a master reproducer within a duplicating system the light shielding coefficient characteristic of the magnetic tape 7 with respect to the obliquely directed light rays projected from the projector is decreased in accordance with a corresponding decrease in the apparent density of the magnetic tape at the tape outlet 2a of the magazine 2 whereby the resulting transmittance of the magnetic tape 7 within the zig-zag condition is high and a substantial quantity of inclined light rays are received by the detector 10 so as to transmit the drive signal to the motor 13. Under such conditions, the transmitting device 3 is driven so as to move the endless magnetic tape 7 to the outlet 2a of magazine 2. When however the magnetic tape 7 is transferred around to the outlet 2a so as to increase the apparent density of the tape, the shielding material, that is, the tape, upon which the inclined light rays, directed between the projector and the detector 10, will impinge is increased whereby the transmittance is decreased and the detector 10 does not receive a substantial amount of light rays from the projector and accordingly the motor is deactivated.

In other words, within the magnetic tape apparatus constructed in accordance with the present invention, the apparent density of the magnetic tape disposed about the tape outlet is detected as a function of the light ray transmittance whereby changes in the same serve to drive the transferring device in an ON-OFF mode by means of the signals emitted by the detection device so as to control the transfer of the magnetic tape within the magazine. Accordingly, the apparent density of the magnetic tape about the tape outlet of the magazine can be maintained constant, and the take-up resistance of the magnetic tape maintained uniform so as to attain a stable flow of the magnetic tape. Furthermore, when the magazine is made of a transparent material, the movement of the magnetic tape within the magazine can be easily observed and the detection means comprising the projector and the detector can be easily set.

In summary, in accordance with the present invention, a change in the apparent density of the tape within a magazine having a suitable volume can be converted into a change in the quantity of light transmitted and such change in the quantity of light transmitted can be detected and utilized to suitably drive tape transfer apparatus for transferring the magnetic tape within the magazine, whereby the concentration of the magnetic tape at the outlet can be prevented and the undesirable compression of the magnetic tape while in the zig-zag condition can also be prevented. In addition, the movement of the magnetic tape within the magazine is carried out by transferring the magnetic tape from the magazine inlet, and accordingly, the take-up resistance of the magnetic tape is slight and uniform so as to render a smooth and stable run or flow of the magnetic tape.

Referring now to FIGS. 6-9, another embodiment of the present invention is illustrated as comprising a pancake type feed reel 30, a feeding device generally indicated by the reference character 31 for feeding the magnetic tape from the reel 30, a master loop box generally indicated by the reference character 32 for temporarily maintaining and storing the magnetic tape fed by means of the feeding device 31 in a zig-zag condition or configuration, a tensioner generally indicated by the reference character 33 for imparting a predetermined tension to the tape fed from the master loop box 32, a magnetic head 34, a constant speed travelling device 35, and a take-up reel 36, all of which are serially disposed upon a vertical plane plate 29 in the direction extending from the upper portion thereof to the lower portion thereof. In this manner, the magnetic tape fed from the feed reel 30 is temporarily maintained within the master loop box 32 and is subsequently fed at a predetermined constant speed, under recording conditions for example, so as to be taken-up by means of the take-up reel 36, all in a manner which is conventional.

The feeding device 31 comprises a capstan 31a and a pinch-roller 31b and the rotary drive of the feeding device 31 is independent of the rotary drive of the take-up reel 36. The constant speed travelling device 35 similarly comprises a capstan 35a and a pinch-roller 35b, and the master loop box 32 comprises the feeding device 31 and a rectangular magazine 32a which is made of transparent material, such as for example, an acryl type resin and glass. The magazine is equipped with the feeding device 31 which is disposed at the inlet of the magnetic tape magazine which is provided at the top thereof while an outlet for the magnetic tape is provided at the bottom thereof, tape density detecting devices 32b–32e being also provided within the vicinity of the four corners of the magazine 32a.

When the detecting devices 32b–32e detect the fact that the apparent tape densities at the four corners of the magazine reach a predetermined value, the feeding device 31 is de-activated. When it is found that one of the tape densities has not reached the predetermined value, the motor 31c for the feeding device 31 is driven so as to feed the magnetic tape would upon the feed reel 30 into the magazine 32a so as to maintain a constant apparent density or volume of the magnetic tape within the magazine 32a.

Within this embodiment of the invention, the detecting devices 32b–32e for detecting and measuring the apparent density of the magnetic tape within the magazine 32a comprise photo-electric detectors 32b–32e, such as for example, Cds detectors, which are disposed upon one side of the magazine 32a and a suitable light source not shown, disposed upon the other side of the magazine, baffle plates 32b''–32e'' being interposed between the light source and the magazine 32a whereby only light, crossing or traversing the magnetic tape and projected without interference with the shielding and the tape, of a sufficient density reaches the detectors. The signals of the detecting devices 32b'–32e' reflecting the change in the apparent density of the magnetic tape which reflects the change in the quantity of light detected, are respectively transmitted and applied to the NAND circuit 32f which is in turn connected to a relay switching circuit 32g for the motor 31c. It should be noted that the detectors are not limited to the structure noted hereinabove and can alternatively be of the type for detecting the apparent density of the magnetic tape at the inlet or upper portion of the magazine and the outlet or lower portion of the magazine, the feeding device 31 being controlled so as to always maintain constant the volume of the magnetic tape within the magazine 32a.

In addition, a pair of feed control rollers 37a and 37b are disposed at the tape outlet of the magazine 32a and are disposed with respect to each other whereby a gap wider than the thickness of the magnetic tape is defined therebetween. The rollers are rotated at a relatively high number of revolutions per minute in the direction tending to feed the magnetic tape back into the magazine, and the circumferential speed of the rollers is set to be faster than that of the take-up speed of the magnetic tape so as to prevent the withdrawal of the magnetic tape from the magazine outlet in a zig-zag condition.

The tensioner 33, comprising a rod 33a and an elastic member 33c pressed upon the rod 33a by means of a spring 33b so as to impart a predetermined tension to the magnetic tape, is disposed below the magazine 32a. The elastic member 33c is preferably made of a material having a small amount of frictional resistance, such as for example, felt, and it is thus possible to impart a predetermined amount of tension to the magnetic tape whereby the same will always contact magnetic head 34 as the tape passes the same. It is also preferable that the capstan 35a have a structure which tends to decrease the inertia force so as to shorten the threshold period, and which will also impart a predetermined speed to the magnetic tape by contacting the pinch-roller 35b so as to always maintain the latter in a rotatable state. It should be noted further than the master loop box 32 can be incorporated within horizontally disposed structure wherein the magnetic tape disposed in the zig-zag condition may be pressed to the magazine outlet by means of air pressure.

As stated above, within the embodiment of the magnetic tape apparatus constructed in accordance with the present invention wherein the magnetic tape is wound upon the feed reel in a pancake shape, the tape is removed therefrom and temporarily stored in a zig-zag condition and is subsequently taken up at a constant rate of speed for recording purposes for example, and the volume of the magnetic tape within the box is maintained constant. Accordingly, the inertia force of the feed reel and the fluctuation in the resistance of removing the tape from the feed reel only affect the feeding device and do not affect the constant speed travelling device. Only the resistance of removing the magnetic tape from the master loop box, wherein a constant volume of the magnetic tape is maintained, is imparted to the constant speed travelling device, where the resistance is quite low, and accordingly, the decrease in the threshold period as well as in the fluctuation in the speed can be attained as a result of the high constant speed travelling of the magnetic tape, and consequently, high efficiency in the recording characteristics can be attained.

Obviously, many modifications and variations of the present invention are possible in light of the above teachings. It is to be understood therefore that within the scope of the appended claims the present invention may be practiced otherwise than as specifically described herein.

What is claimed as new and desired to be secured by letters patent of the united states is:

1. A magnetic tape apparatus comprising:
    a master loop box having a magazine for temporarily storing a magnetic tape in a zig-zag condition;
    a transferring device disposed within said magazine so as to move and support said magnetic tape disposed within said magazine in said zig-zag condition to a tape outlet of said magazine;
    detector means disposed within said magazine for detecting the apparent packing density of said magnetic tape adjacent said tape outlet and for emitting a signal when said density is less than a predetermined value; and
    means for intermittently driving said transferring device in response to said signal so as to transport said zig-zag configured tape from a high density region to the low density region adjacent said tape outlet and thereby maintain said density substantially constant.

2. A magnetic tape apparatus as set forth in claim 1, wherein:
said magnetic tape is an endless magnetic tape; and
said transferring device is disposed within the bottom portion of said magazine.

3. A magnetic tape apparatus comprising:
a master loop box interposed between a feed reel and a take-up reel so as to temporarily store a magnetic tape, being fed from said feed reel and conducted to said take-up reel, in a zig-zag condition;
said master loop box including a magazine having a tape inlet and a tape outlet at different ends thereof and detector means disposed within said magazine near said tape inlet and said tape outlet of said magazine for detecting the apparent packing density of said tape within said magazine and for emitting a signal when said density is less than a predetermined value;
means disposed at said tape inlet for intermittently feeding said magnetic tape from said feed reel into said magazine in response to said signal from said detector and thereby maintain said density substantially constant;
feed control roller means disposed at said tape outlet so as to control the feed of said magnetic tape to said take-up reel; and
a tensioner interposed between said master loop box and a magnetic head so as to impart a predetermined tension to said magnetic tape whereby said tape will contact said magnetic head;
said feed control roller means including a pair of rollers rotating in a direction tending to feed said tape, being withdrawn from said magazine and conducted to said take-up reel, back into said magazine, whereby said rollers constantly interact with said tape in said zig-zag condition so as to retain said zig-zag configured loops of said tape within said magazine while permitting said tape to pass between said rollers and be fed from said magazine in a linear manner to said take-up reel.

4. The magnetic tape apparatus as set forth in claim 1, wherein:
said master loop box is vertically disposed and said magnetic tape is moved in a zig-zag condition from the upper part thereof to the lower part thereof by means of the weight of said magnetic tape, and said transferring device is disposed within the bottom portion of said master loop box.

5. The magnetic tape apparatus as set forth in claim 1, further comprising:
light means for projecting light rays to said detector; and
baffle means disposed in front of said detector for permitting only light rays inclined to the surface of said detector to reach said detector.

6. The magnetic tape apparatus as set forth in claim 1, wherein:
said transferring device is a belt.

7. The magnetic tape apparatus as set forth in claim 1, wherein:
said master loop box is horizontally disposed and said magnetic tape is moved by air means; and
said transferring device is disposed at one side of said master loop box.

8. The magnetic tape apparatus as set forth in claim 1 wherein:
said transferring device includes a plurality of rollers.

* * * * *